Aug. 20, 1929.  A. R. STEVENS  1,725,311
HAIR CUTTING AND TRIMMING DEVICE
Filed Aug. 13, 1928
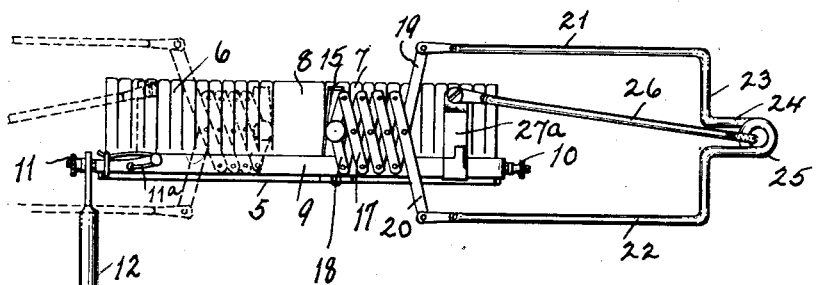
Fig. 1.
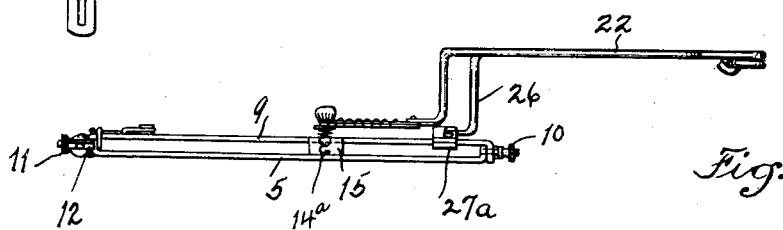
Fig. 2.
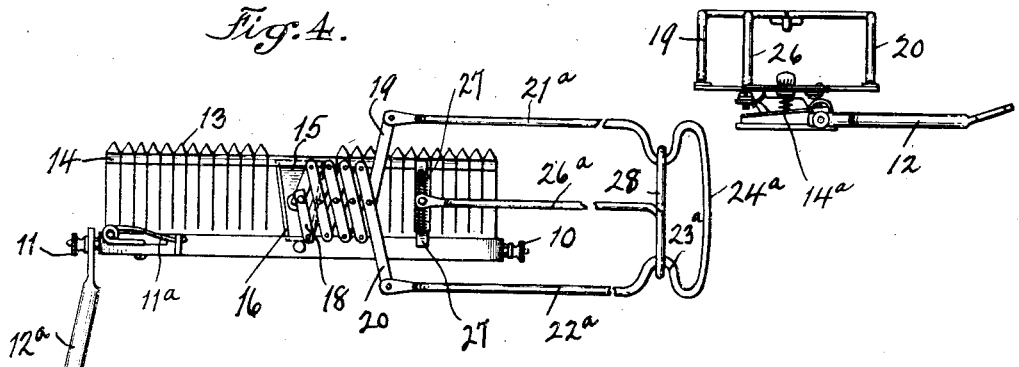
Fig. 4.
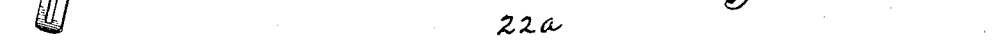
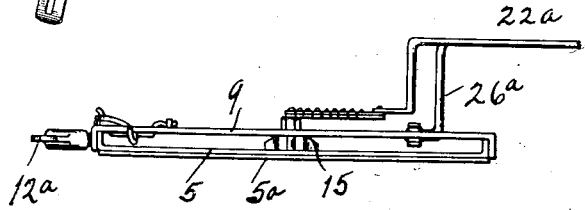
Fig. 5.
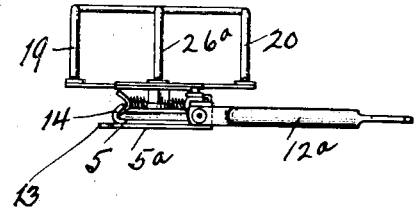
Fig. 6.
INVENTOR
Arthur Stevens
BY
Aaron L. Applebaum
ATTORNEY Patented Aug. 20, 1929.

1,725,311

UNITED STATES PATENT OFFICE.

ARTHUR R. STEVENS, OF BRONX, NEW YORK.

HAIR CUTTING AND TRIMMING DEVICE.

Application filed August 13, 1928. Serial No. 299,398.

This invention relates to hair cutting and trimming devices and more particularly to a combined comb and shearing blade mechanically operable by hand across the teeth of the comb.

One of the objects of my invention is to provide a combined comb and shearing knife or blade constructed and arranged whereby the handle or hand grip for operating the blade may be manipulated from either end of the comb.

A further and continued object of my invention is to provide a combined comb and shearing blade, said blade being connected by a lazy-tong arrangement to a manipulating handle whereby said blade may be operated across the teeth of said comb.

To enable others skilled in the art to more fully comprehend the underlying features of my invention, reference is had to the accompanying drawing forming a part of the specification in which Fig. 1 is a top plan of the device and showing the manipulating handle and blade in its two operative positions.

Fig. 2 is a side view.

Fig. 3 is an end view.

Fig. 4 is a top plan of a slightly modified form of the invention.

Fig. 5 is a side view of the modified form of the invention, and

Fig. 6 is an end view.

Referring now to the drawings wherein like reference characters designate corresponding parts throughout the several views, 5 designates a flat plate having a series of teeth 6, 7, on each side of a central blank or smooth surface 8. A removably flat bar 9 extending from end to end is secured thereto by set screws and lock nuts 10, 11. The set screws and lock nuts 10, 11 are also adapted to retain a short rod 12 which assists the operator in handling and manipulating a comb permanently fastened or attached to the bottom of the plate 5 so that the teeth 13 of the comb extends slightly beyond the edge of the blade, it being understood that the spaced teeth of the comb and the teeth 6, 7 of the blade, are in registration or coincide. The top of the blade 5 is also provided with a guide 14 extending from end to end, the said guide and bar 9 being spaced to receive a sliding flat shearing blade or knife 15 having an angular cutting edge 16, and an adjustable tightening spring 14$^a$ on the blade.

Pivotally connected to the knife 15 and centrally thereof is a lazy-tong construction consisting of pivoted links 17, 18, the end links 19, 20 being considerably longer and extending beyond the sides of the device for connection to the arms 21, 22 of a manipulating, resilient handle or grip. The arms 21, 22 are bent inwardly as at 23 and outwardly as at 24 into a loop or eye 25. Connected to the loop 25 is a retaining rod 26 secured to a clip or clamp plate 27 adjustably connected to the bar 9, by a clamping spring 27$^a$.

In operating the device, as shown for instance in Fig. 1, the blade 15 is limited in its movement back and forward across the teeth 6 of the blade and the teeth 13 of the comb so that by pressing or urging the arms 21, 22 by hand toward each other, the blade is projected across the teeth so as to clip the hair entering the spaces between said teeth. The rod 12 and the manipulating handle assist the operator in handling, guiding and supporting the comb during the combing operation when the blade is not being manipulated and also assists during the cutting or shearing of the hair either on the right or left side of the head.

In order to permit the operator to perform the combing and-cutting of the hair from the opposite side of the head, for instance, the rod 12 may be reversed and positioned on the set screw 10 and by disconnecting the clamp 27 and positioning the same at the opposite end of the plate, 5, the entire handle or manipulating arms 21, 22 may be reversed or rotated at the pivot connecting. the lazy tongs to the blade and from the full line to the dotted line position as shown in Fig. 1.

In Figs. 4 to 6 inclusive, I have shown a slightly modified form of the invention wherein the resilient arms 21$^a$, 22$^a$ are integral or formed of a single bent rod, bent inwardly as at 23$^a$ into an end loop 24$^a$. A retaining rod 26$^a$ is formed with a ring 28 and is attached to the inwardly bent portions 23$^a$ and to the handle at one end and to a spring clamping member 27.

In this form of the invention, the rod 12$^a$ may be slightly offset in order to assist the operator in handling the device more conveniently for guiding and supporting the comb. However, in both forms of the invention, a steel plate is made up in the form of a comb and is used as a comb, neither of which forms are modified to receive the manipulating handle and the shearing or cutting blade 15 connected thereto. It will be noted that only a portion of the comb and teeth are employed when the shearing blade is operated from left to right or when reversed from right to left as indicated by Fig. 1 of the drawing. Furthermore, in each form of the invention, a spring 11ª tends to urge the blade 15 across the space of the last few teeth to complete the throw of the blade the entire distance.

While I have shown and described my invention with some degree of particularity, it will be understood that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention what I claim as new and desire to secure by Letters Patent is:

1. A device of the class described comprising a plate having a series of teeth at each end and a comb attached to the bottom of said plate, the teeth of said comb being in registration with the teeth of the plate, a longitudinal guide formed with the said plate, a guide bar opposite the longitudinal guide, a flat shearing blade operable across said teeth between the guide and guide bar and a resilient handle for actuating said blade across the teeth at either end of the said plate and comb.

2. A device of the class described comprising a plate having a series of teeth and a comb attached to the bottom of the plate, the teeth of said plate and comb being in registration, a longitudinal guide formed with the top of the plate, a guide bar fastened to the plate and opposite to the guide, a shearing blade operable across the teeth, lazy-tongs connected to the blade and a resilient manipulating handle connected to said lazy-tongs, whereby the blade may be operated across said teeth.

In testimony whereof I affix my signature.

ARTHUR R. STEVENS.